United States Patent
Huang

(10) Patent No.: US 11,134,541 B2
(45) Date of Patent: Sep. 28, 2021

(54) AP DEVICE, IOT DEVICE, AND COMMUNICATION DEVICE

(71) Applicant: NEW H3C TECHNOLOGIES CO., LTD., Hangzhou (CN)

(72) Inventor: Xiang Huang, Beijing (CN)

(73) Assignee: New H3C Technologies Co., Ltd., Zhejiang (CN)

(*) Notice: Subject to any disclaimer, the term of this patent is extended or adjusted under 35 U.S.C. 154(b) by 108 days.

(21) Appl. No.: 16/487,316

(22) PCT Filed: Feb. 11, 2018

(86) PCT No.: PCT/CN2018/076306
§ 371 (c)(1),
(2) Date: Aug. 20, 2019

(87) PCT Pub. No.: WO2018/149379
PCT Pub. Date: Aug. 23, 2018

(65) Prior Publication Data
US 2020/0178354 A1 Jun. 4, 2020

(30) Foreign Application Priority Data

Feb. 20, 2017 (CN) .......................... 201710091624.2

(51) Int. Cl.
*H04W 88/08* (2009.01)
*H04B 1/03* (2006.01)
(Continued)

(52) U.S. Cl.
CPC ............. *H04W 88/08* (2013.01); *G16Y 10/75* (2020.01); *G16Y 30/00* (2020.01); *H04B 1/03* (2013.01);
(Continued)

(58) Field of Classification Search
CPC . H04W 88/08; H04W 84/045; H04W 84/105; H04W 88/10; H04L 67/12;
(Continued)

(56) References Cited

U.S. PATENT DOCUMENTS 10,756,980 B2 * 8/2020 Park ...................... H04L 67/303
2014/0111934 A1 * 4/2014 Chang ................... G06F 13/382
361/679.41
(Continued)

FOREIGN PATENT DOCUMENTS

CN 101538959 A 9/2009
CN 201428301 Y 3/2010
(Continued)

OTHER PUBLICATIONS

State Intellectual Property Office of the People's Republic of China, Office Action and Search Report Issued in Application No. 201710091624.2, dated Sep. 27, 2020, 23 pages. (Submitted with Machine Translation).
(Continued)

*Primary Examiner* — Andrew Wendell
(74) *Attorney, Agent, or Firm* — McCoy Russell LLP

(57) ABSTRACT

According to examples of the present disclosure, an access point (AP) device, an Internet of Things (IoT) device, and a communication device are provided. The AP device may include an AP housing, a control board arranged within the AP housing, and a first electrical connecting part and a first assembly part arranged on the AP housing. The control board and the IoT device are electrically connected by the first electrical connecting part. The AP device may assemble with the IoT device by way of the first assembly part.

10 Claims, 4 Drawing Sheets

(51) Int. Cl.
  *H04B 1/08* (2006.01)
  *G16Y 30/00* (2020.01)
  *G16Y 10/75* (2020.01)
  *H04L 29/08* (2006.01)
  *H04Q 1/24* (2006.01)
  *H01Q 1/24* (2006.01)

(52) U.S. Cl.
  CPC ............. *H04L 67/12* (2013.01); *H01Q 1/243* (2013.01); *H04B 1/08* (2013.01); *H04Q 1/245* (2013.01)

(58) Field of Classification Search
  CPC . H04L 29/08; H04B 1/03; H04B 1/08; G16Y 30/00; G16Y 10/75; H01Q 1/243; H04Q 1/245
  See application file for complete search history.

(56) References Cited

U.S. PATENT DOCUMENTS

| | | | |
|---|---|---|---|
| 2015/0230167 A1* | 8/2015 | Choi | H04W 12/06 455/411 |
| 2016/0135241 A1 | 5/2016 | Gujral et al. | |
| 2016/0226138 A1* | 8/2016 | Liu | H01Q 1/48 |
| 2016/0255301 A1 | 9/2016 | Vadura | |
| 2016/0371074 A1* | 12/2016 | Vyas | H04W 4/60 |
| 2017/0123476 A1* | 5/2017 | Engler | G11C 5/141 |
| 2017/0353859 A1* | 12/2017 | Idnani | H04W 12/08 |
| 2018/0027359 A1* | 1/2018 | Gonzalez | H05B 47/19 370/254 |
| 2018/0212844 A1* | 7/2018 | Quinn | H04L 43/0876 |

FOREIGN PATENT DOCUMENTS

| | | |
|---|---|---|
| CN | 101728703 A | 6/2010 |
| CN | 101881098 A | 11/2010 |
| CN | 204291029 U | 4/2015 |
| CN | 105743658 A | 7/2016 |
| JP | 01064175 U1 | 4/1989 |
| JP | H08329205 A | 12/1996 |
| JP | 2011165564 A | 8/2011 |
| JP | 2017004864 A | 1/2017 |
| JP | 2017033775 A | 2/2017 |
| KR | 101697569 B1 | 2/2017 |

OTHER PUBLICATIONS

Japanese Patent Office, Office Action Issued in Application No. 2019-544912, dated Nov. 24, 2020, 13 pages. (Submitted with Machine Translation).

ISA State Intellectual Property Office of the People's Republic of China, Written Opinion of the International Searching Authority Issued in Application No. PCT/CN2018/076306, dated May 18, 2018, WIPO, 4 pages.

State Intellectual Property Office of the People's Republic of China, Office Action and Search Report Issued in Application No. 201710091624.2, dated Nov. 29, 2019, 20 pages. (Submitted with Partial Translation).

European Patent Office, Extended European Search Report Issued in Application No. 18755008.2, dated Dec. 11, 2019, Germany, 7 pages.

State Intellectual Property Office of the People's Republic of China, Office Action and Search Report Issued in Application No. 201710091624.2, dated May 21, 2020, 20 pages. (Submitted with Machine Translation).

ISA State Intellectual Property Office of the People's Republic of China, International Search Report Issued in Application No. PCT/CN2018/076306, dated May 18, 2018, WIPO, 4 pages.

Japanese Patent Office, Office Action Issued in Application No. 2019-544912, dated Jul. 6, 2021, 7 pages.

* cited by examiner

AP DEVICE, IOT DEVICE, AND COMMUNICATION DEVICE

CROSS-REFERENCE TO RELATED APPLICATIONS

This present application is a U.S. National Phase of International Patent Application Serial No. PCT/CN2018/076306 entitled "AP DEVICE, INTERNET-OF-THINGS DEVICE, AND COMMUNICATION DEVICE," filed on Feb. 11, 2018. International Patent Application Serial No. PCT/CN2018/076306 claims the priority to Chinese Patent Application No. 201710091624.2 filed on Feb. 20, 2017. The entire contents of each of the above-cited applications are hereby incorporated by reference in their entirety for all purposes.

BACKGROUND

Mainstream communication protocols supporting the Internet of Things (IoT) include, for example, Zigbee, BLE, RFID, ANT+, and so on. In order to connect all terminals supporting different protocols, it is needed to purchase communication devices supporting different protocols.

For example, for an access point (AP) device, different IoT protocols may be supported by inserting different IoT modules on a control board after the housing of the AP device is opened. This manner is similar to opening the housing of a notebook computer to add a memory.

However, during the process of disassembling the housing of the AP device to insert different IoT modules for extension, a physical damage such as electrostatic breakdown may occur to damage the control board of the AP device. Maintenance cost may be increased if professionals are invited to carry out plug operation of extension modules.

DETAILED DESCRIPTION OF THE EMBODIMENTS

Technical solutions in the examples of the present disclosure will be described clearly and completely below, in conjunction with the accompanying drawings in the examples of the present disclosure. Apparently, the described examples are some but not all of the examples of the present disclosure. All other examples obtained by persons of ordinary skill in the art based on the examples of the present disclosure without creative efforts shall fall within the protection scope of the present disclosure.

Terms used in the present disclosure are only for the purpose of description of specific examples, and are not intended to limit the present disclosure. As used in the present disclosure and appended claims, the singular forms "a/an", "said" and "the" intend to also include the plural form, unless the content clearly dictates otherwise. It should also be understood that the term "and/or" used herein means to include arbitrary and all possible combinations of one or more items listed in association.

As shown from FIG. 1 to FIG. 4, an access point (AP) device 10 according to the present disclosure may include an AP housing 11, a control board (not shown) arranged in the AP housing 11, a first electrical connecting part 12 arranged on the AP housing 11, and a first assembly part 13 arranged on the AP housing 11. The first electrical connecting part 12 is electrically connected to the control board. The control board may be provided with a CPU and is configured to process and control communication contents.

Figure 3:
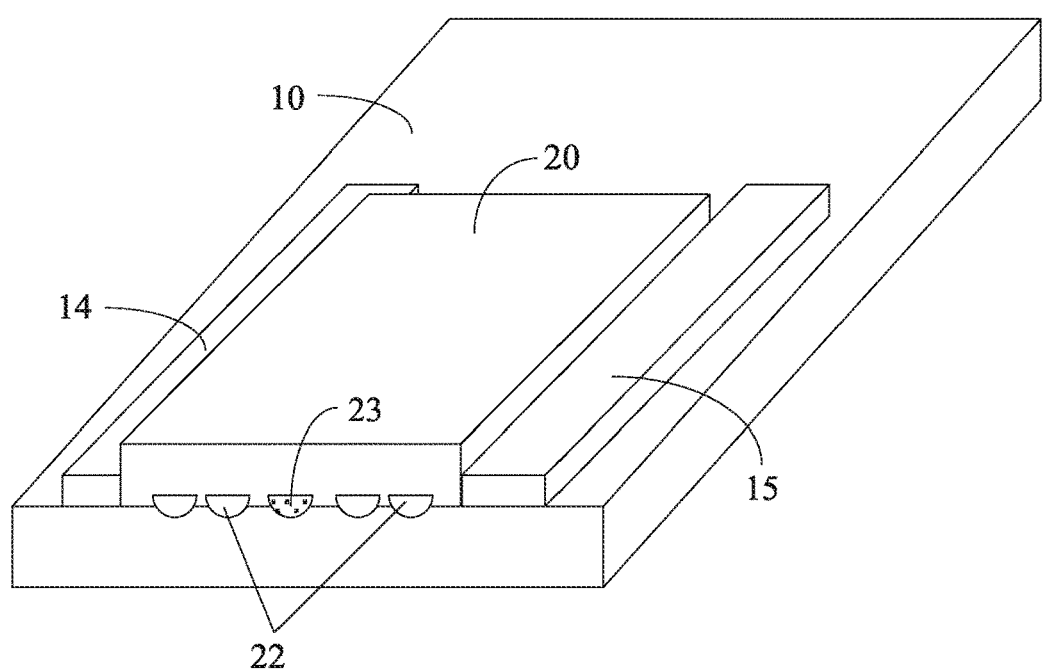
FIG. 3 illustrates a schematic diagram of assembly of an AP device with an IoT device according to an example of the present disclosure.
Figure 4:
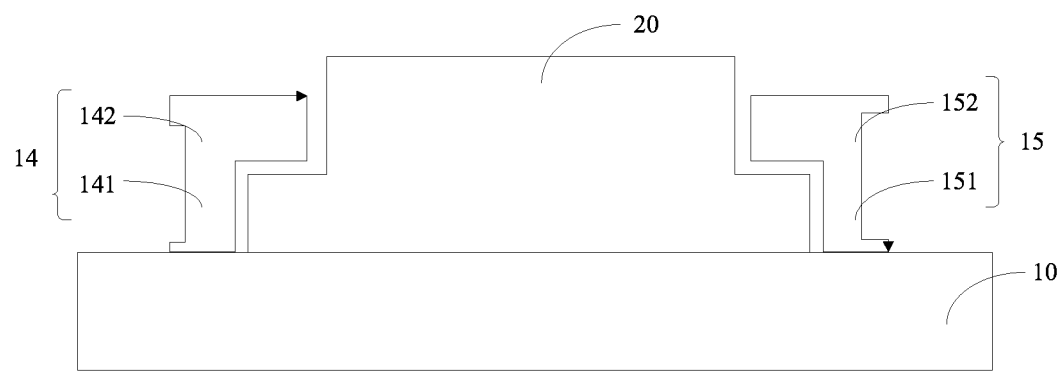
FIG. 4 illustrates a schematic cross-sectional view of assembly of an AP device with an IoT device according to an example of the present disclosure.

The first assembly part 13 may be configured to assemble an IoT device 20 as shown in FIG. 3 and FIG. 4. The IoT device 20 may be a hardware device such as a sensor, a radio frequency identification device (RFID), an embedded device and a communication device, etc. After the AP device 10 assembles the IoT device 20 by the first assembly part 13, the first electrical connecting part 12 may be electrically connected to the IoT device 20, for example, connected to the second electrical connecting part 22, such that the IoT device 20 may be simply assembled on the AP housing 11. In the process of upgrading the IoT device 20 in the future, it may be replaced with the IoT device 20 with the latest communication protocol without disassembling the AP device 10. Therefore, the user's existing investment may be guaranteed to the greatest extent.

In an alternative example of the present disclosure, the first electrical connecting part 12 may be a plurality of metal contacts arranged on the surface of the AP housing 11. The AP device 10 may further include communication pins (not shown) and power supply pins (not shown) connected between the metal contacts and the control board. Correspondingly, the IoT device 20 may be provided with elastic metallic contact pins electrically connected to the metal contacts, such that a simple assembly of the IoT device 20 with the AP device 10 may be satisfied, thereby facilitating quick replacement of the IoT device 20 under different protocols. In other examples, the first electrical connecting part 12 on the AP device 10 may be also may be the elastic metallic contact pin, and the second electrical connecting part 22 of the IoT device 20 may be the metal contact. Of course, in other examples of the present disclosure, the first electrical connecting part 12 also may be a male connector or female connector of any structure type, and any quick hot-pluggable electrical connecting part shall fall within the present disclosure.

The first assembly part 13 may be a magnetic component arranged on the AP housing 11. Correspondingly, a second assembly part 23 arranged on the IoT device 20 may be a magnetic component attracting the first assembly part 13. The first assembly part 13 and the second assembly part 23 may be attracted by way of a magnet and an iron block or by way of a magnet and another magnet (opposite ends the two magnets herein are heterospolar), such that the IoT device 20 is fixed to the AP device 10. This manner of cooperation may allow a better contact between the first electrical connecting part 12 and the second electrical connecting part 22, such that a broken circuit resulted from an unreliable connection may be effectively avoided. Moreover, this manner of cooperation may further facilitate the IoT device 20 to be disassembled from the AP device 10. Of course, in other examples of the present disclosure, the first assembly part 13 also may have a telescopic clamping arm for clamping the IoT device 20. The manner of connection between the first assembly part 13 and the second assembly part 23 also may be a manner of cooperation between an elastic clamping piece and a latching slot, etc.

Figure 2:
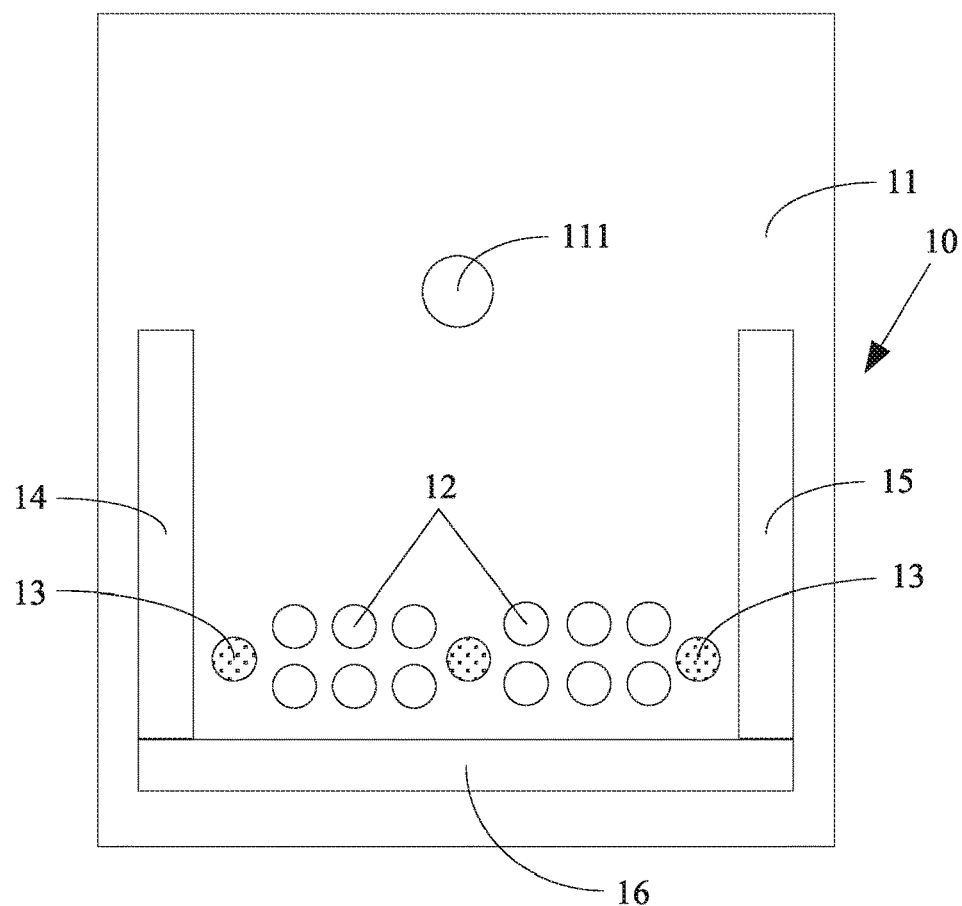
FIG. 2 illustrates a schematic structural diagram of an AP device according to another example of the present disclosure.

Further, the AP device 10 may further include a first limit guide rail 14 and a second limit guide rail 15 arranged on the AP housing 11, as shown in FIG. 2. An assembly space for the IoT device 20 may be formed between the first limit guide rail 14 and the second limit guide rail 15, such that the IoT device 20 may be assembled between the first limit guide rail 14 and the second limit guide rail 15. Consequently, the AP device 10 may have an easily recognizable assembly location, and the IoT device 20 may have a unique assembly location. The first electrical connecting part 12 and the first assembly part 13 are positioned between the first limit guide rail 14 and the second limit guide rail 15.

In this example, each of the first limit guide rail 14 and the second limit guide rail 15 may include a main body for limiting and a limiting part arranged on the main body for limiting. That is, the first limit guide rail 14 includes a main body for limiting 141 and a limiting part 142 arranged on the main body for limiting 141, and the second limit guide rail 15 includes a main body for limiting 151 and a limiting part 152 arranged on the main body for limiting 151. A distance between the two main bodies for limiting 141, 151 may be greater than a distance between the two limiting parts 142, 152, such that the first limit guide rail 14 and the second limit guide rail 15 may have structures shaped like "7" and arranged oppositely. In this way, the two main bodies for limiting 141, 151 may cooperate with each other to clamp the IoT device 20, and the two limiting parts 142, 152 are used for limiting the movement of the IoT device 20 along a vertical direction, such that the IoT device 20 is limited to glide only along axial directions of the first limit guide rail 14 and the second limit guide rail 15.

As shown from FIG. 2 to FIG. 6, the AP device 10 generally is placed in a public area, and thus the IoT device 20 is likely to be stolen if no anti-theft measures are taken for the IoT device 20. Therefore, the AP device 10 may further include a stopper 16 arranged on the AP housing 11 and an antitheft device 17 arranged on the AP housing 11. After the IoT device 20 is assembled on the AP device 10, the stopper 16 and the antitheft device 17 may be respectively positioned at two ends of the IoT device 20. The stopper 16 may be in cooperation with the antitheft device 17 to limit a longitudinal movement of the IoT device 20. The first limit guide 14 may be in cooperation with the second limit guide 15 to limit a transverse movement of the IoT device 20. The stopper 16, the first limit guide 14 and the second limit guide 15 may be fixed to the AP housing 11. The antitheft device 17 may be controlled to stretch out of the AP housing 11 or withdraw into the AP housing 11, such that the IoT device 20 may be detachably assembled on the AP device 10 under the control of the antitheft device 17. In this example, the transverse direction is a direction vertical to the first limit guide 14 and the second limit guide 15, and the longitudinal direction is an axial direction of the first limit guide 14 and the second limit guide 15.

Figure 1:
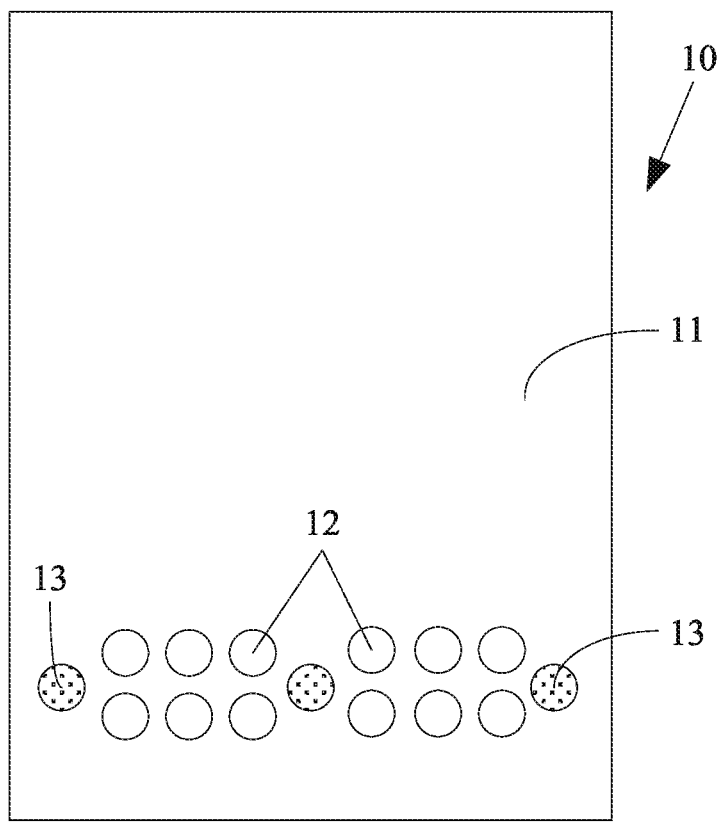
FIG. 1 illustrates a schematic structural diagram of an AP device according to an example of the present disclosure.
Figure 5:
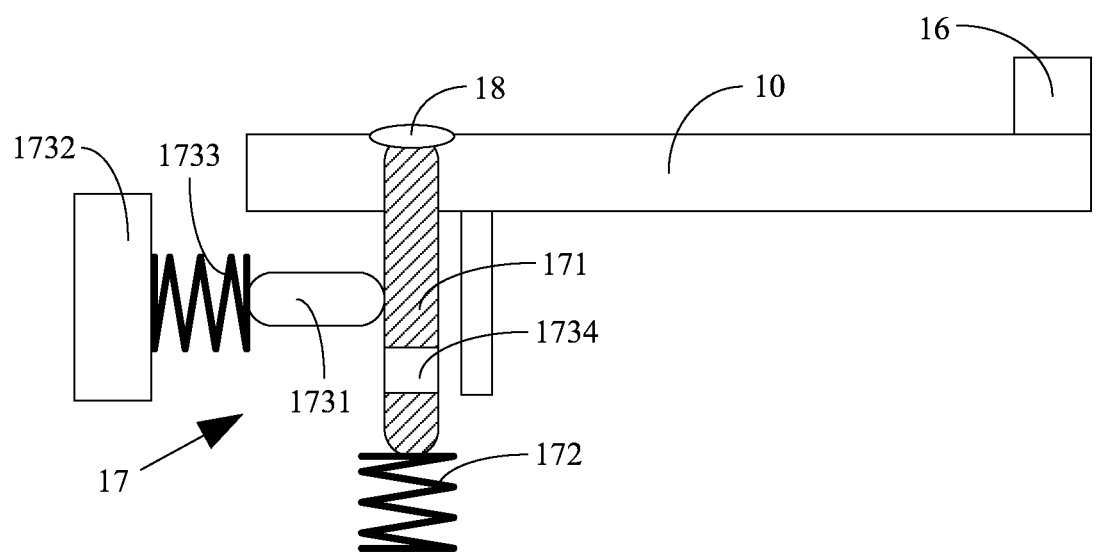
FIG. 5 illustrates an operation state diagram of an antitheft device according to an example of the present disclosure.
Figure 6:
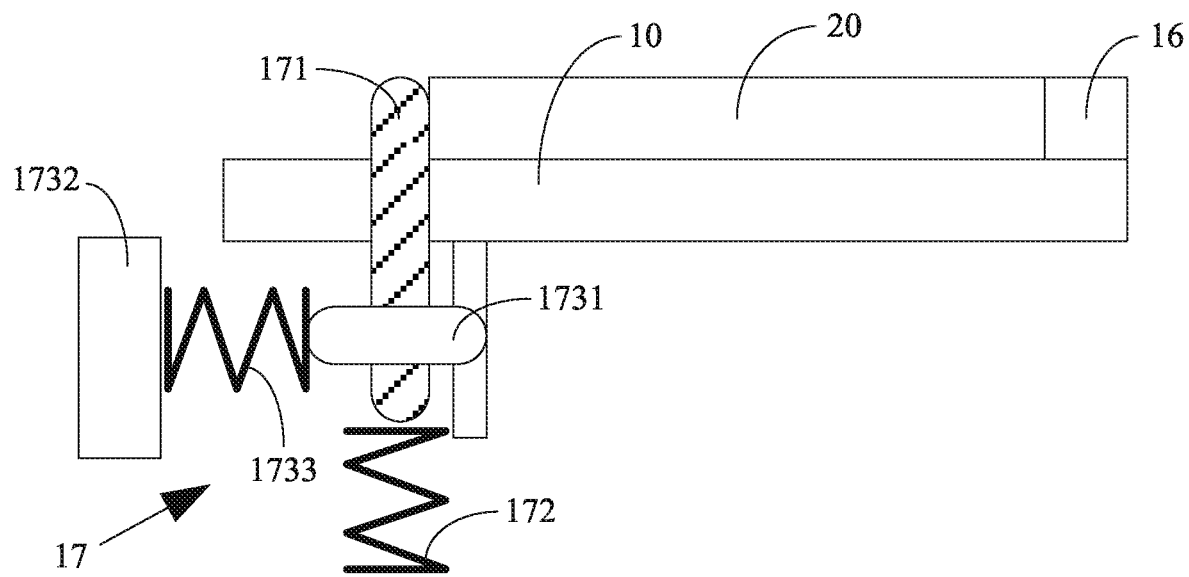
FIG. 6 illustrates another operation state diagram of an antitheft device according to an example of the present disclosure.

In another example, as shown in FIG. 5 and FIG. 6, the antitheft device 17 may include an antitheft bolt 171, a first elastic member 172 connected at a tail end of the antitheft bolt 171, and a locking mechanism in cooperation with the antitheft bolt 171. As shown in FIG. 1, a through hole 111 may be provided on a location on the AP housing 11 corresponding to the antitheft bolt 171, such that the antitheft bolt 171 stretches out of the AP housing 11 or withdraws into the AP housing 11 via the through hole 111. Furthermore, the AP device 10 also may include, for example, a choke plug 18 covering the through hole 111 as shown in FIG. 5. The through hole 111 may be covered by the choke plug 18 when it is unnecessary to use the antitheft device 17.

In this example, when the AP device 10 does not need to use the IoT device 20 or the antitheft device 17, the antitheft bolt 171 may not go beyond the surface of the AP housing 11, just as shown in FIG. 5, and the choke plug 18 may abut against the top of the antitheft bolt 171, such that the first elastic member 172 is in a compressed state.

The choke plug 18 may be removed when it is necessary to use the antitheft device. At this moment, as shown in FIG. 6, under a restoring force, the first elastic member 172 allows the antitheft bolt 171 to stretch out of the surface of the AP housing 11 to abut against the IoT device 20. At this moment, the first elastic member 172 is in an initial state free from any external force. Meanwhile, the locking mechanism may be connected to the antitheft bolt 171 to limit the movement of the antitheft bolt 171. The portion of the antitheft bolt 171 stretching out of the AP housing 11 may limit, together with the stopper 16, the longitudinal movement of the IoT device 20. Furthermore, limited by the first limit guide 14 in cooperation with the second limit guide 15, the IoT device 20 may be firmly fixed to the AP device 10.

The locking mechanism may include a latch 1731, an electromagnet 1732, and a second elastic member 1733 connected between the latch 1731 and the electromagnet 1732. As shown in FIG. 5, the electromagnet 1732 may be electrically connected to a control board in the AP device 10. The control board may control power supplied to the electromagnet 1732 by way of instructions, such that the electromagnet 1732 attracts the latch 1731 by way of magnetic property. The antitheft bolt 171 may include a lockhole 1734 in cooperation with the latch 1731. When the choke plug 18 is drawn out such that the first elastic member 172 is recovered to the initial state, the antitheft bolt 171 may stretch out of the AP housing 11, and the latch 1731 may be inserted into the lockhole 1734 under the restoring force of the second elastic member 1733. In such a case, when the electromagnet 1732 is powered on, the latch 1731 may be sucked out of the lockhole 1734 by the electromagnet 1732, such that the second elastic member 1733 is in a compressed state, and the antitheft bolt 171 may move along an axial direction of the first elastic member 172 under a restoring force of the first elastic member 172. Next, when the AP device 10 stops supplying power to the electromagnet 1732, the second elastic member 1733 may push the latch 1731 in a direction far away from the electromagnet 1732 under the restoring force, such that the latch 1731 is inserted into the lockhole 1734. Both the first elastic member 172 and the second elastic member 1733 may be springs. Of course, the first elastic member 172 and the second elastic member 1733 also may be other elastic elastomers.

Figure 7:
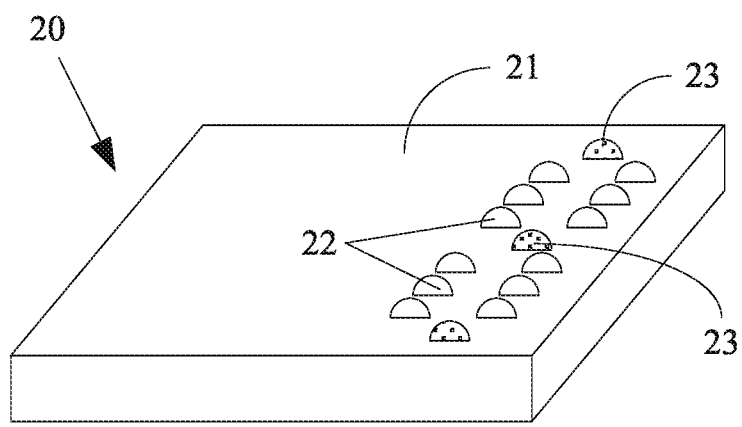
FIG. 7 illustrates a schematic structural diagram of an IoT device according to an example of the present disclosure.

As shown in FIG. 3 and FIG. 7, in another aspect of the examples of the present disclosure, there is also provided an IoT device 20, which may include a housing 21 of the IoT device, a communication module (not shown) arranged in the housing 21 of the IoT device, and a second electrical connecting part 22 arranged on the housing 21 of the IoT device. The structure of the housing 21 of the IoT device may match the accommodation space between the first limit guide 14 and the second limit guide 15. In an alternative example of the present disclosure, two sides of the housing 21 of the IoT device may be shaped like stairs as shown in FIG. 4.

The second electrical connecting part 22 on the housing 21 of the IoT device may be electrically connected to the communication module in the housing 21 of the IoT device and to the first electrical connecting part 12 of the AP device 10, such that the intercommunication between the IoT device 20 and the AP device 10 is implemented. The communication module of the present disclosure may carry out communications based on a Zigbee (a short-range low-energy wireless communication technology) protocol, a Bluetooth Low Energy (BLE) protocol, a Radio Frequency Identification (RFID) protocol, an ANT+(a short range communication protocol) protocol and so on. Of course, the communication module of the present disclosure is not limited thereto, and communication protocols prevailing on the market are applicable to the communication module of the present disclosure.

In an alternative example, the second electrical connecting part 22 may be an elastic metallic contact pin arranged on the housing 21 of the IoT device, and the first electrical connecting part 12 in cooperation with the second electrical connecting part 22 may be a metal contact. Of course, the first electrical connecting part 12 may be the elastic metallic contact pin, and the second electrical connecting part 22 may be the metal contact.

Further, the IoT device 20 may include a second assembly part 23 arranged on the housing 21 of the IoT device to connect the first assembly part 13 of the AP device 10 correspondingly. The second assembly part 23 may be a magnetic component arranged on the housing 21 of the IoT device, and the first assembly part 13 correspondingly attracting the second assembly part 23 may be a magnetic component or an iron block. The first assembly part 13 and the second assembly part 23 may be attracted by way of a magnet and an iron block or by way of a magnet and another magnet, such that the IoT device 20 is fixed to the AP device 10.

The IoT device 20 according to the present disclosure may support different network protocols, integrate different chips, antennas, radio frequencies, baseband signals and so on into one module, and connect the control board of the AP device 10 via an 12C or Serial Peripheral Interface (SPI) interface, such that the IoT device 20 may also act as a gateway. For example, the IoT device 20 supporting ZigBee may communicate with a ZigBee terminal, and may forward the contents of communication to the control board of the AP device 10, such that the control board performs management and control.

As shown from FIG. 2 to FIG. 5, according to still another aspect of the examples of the present disclosure, there is also provided a communication device, which may include the AP device 10 and the IoT device 20. The AP device 10 and the IoT device 20 may be connected for communication by way of an electrical connection between the first electrical connecting part 12 and the second electrical connecting part 22. The IoT device 20 may be assembled on the AP device 10 by way of a connection between the first assembly part 13 and the second assembly part 23. In another example, by way of the antitheft device 17 arranged on the AP device 10, the IoT device 20 may be further fixed, and loss of the IoT device 20 also may be prevented. Concrete structures of the AP device 10 and the IoT device 20 may be as shown in the above examples, and thus are omitted herein.

According to the present disclosure, complex and various IoT modules may be made independent, and the IoT modules may be connected to the AP device by way of insertion to constitute an integrated Wireless Local Area Networks (WLAN) IoT gateway. A user may arbitrarily select and assemble IoT devices under different protocols on the AP device according to needs. In the process of upgrading the IoT devices in the future, the up-to-date IoT devices may directly replace the old IoT devices without disassembling the AP device. Therefore, the maintenance cost may be reduced, and the user's existing investment may be guaranteed to the greatest extent. Moreover, the antitheft problem of the external IoT devices may be solved by smartly using the physical principle of an electromagnet.

Other implementation solutions of the present disclosure will be apparent to those skilled in the art from consideration of the specification and practice of the technical solutions disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims of the present disclosure.

It is to be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. An access point (AP) device, comprising:
   an AP housing;
   a control board arranged in the AP housing;
   a first electrical connecting part arranged on the AP housing;
   a first assembly part arranged on a surface of the AP housing, configured to assemble an Internet of Things (IoT) device; and
   a first limit guide rail and a second limit guide rail arranged on the AP housing,
   wherein the first electrical connecting part is electrically connected to the IoT device and the control board, and the first electrical connecting part and the first assembly part are positioned between the first limit guide rail and the second limit guide rail.

2. The AP device according to claim 1, wherein,
   the first electrical connecting part comprises a plurality of metal contacts arranged on the surface of the AP housing; and
   the metal contacts and the control board are electrically connected by a communication pin and a power supply pin.

3. The AP device according to claim 1, wherein the first assembly part comprises a magnetic component arranged on the AP housing.

4. The AP device according to claim 1, wherein,
   the first limit guide rail comprises:
      a first main body for limiting, and
      a first limiting part arranged on the first main body for limiting;
   the second limit guide rail comprises:
      a second main body for limiting, and
      a second limiting part arranged on the second main body for limiting;

wherein a distance between the first main body for limiting and the second main body for limiting is greater than a distance between the first limiting part and the second limiting part, such that the first limit guide rail and the second limit guide rail are in cooperation with each other to limit a transverse movement of the IoT device.

5. The AP device according to claim 1, further comprising:
a stopper arranged on the AP housing; and
an antitheft device arranged on the AP housing;
wherein the stopper is in cooperation with the antitheft device to limit a longitudinal movement of the IoT device.

6. The AP device according to claim 5, wherein the antitheft device comprises:
an antitheft bolt;
a first elastic member connected at a tail end of the antitheft bolt; and
a locking mechanism in cooperation with the antitheft bolt.

7. The AP device according to claim 6, wherein
the first elastic member is in a compressed state when the antitheft bolt does not go beyond the surface of the AP housing;
when the first elastic member restores from the compressed state to an initial state,
the antitheft bolt moves along an axial direction of the first elastic member under a restoring force of the first elastic member, such that the antitheft bolt stretches out of the surface of the AP housing to abut against the IoT device, and
the locking mechanism is connected to the antitheft bolt to limit a movement of the antitheft bolt.

8. The AP device according to claim 6, wherein the locking mechanism comprises:
a latch;
an electromagnet;
a second elastic member connected between the latch and the electromagnet; and
a lockhole arranged on the antitheft bolt and in cooperation with the latch.

9. The AP device according to claim 8, wherein
the latch is inserted into the lockhole when the second elastic member is in an initial state; and
when the electromagnet is powered on,
the latch is sucked out of the lockhole by the electromagnet, and
the second elastic member is in a compressed state.

10. A communication device, comprising:
the AP device according to claim 1; and
an IoT device comprising: a housing of the IoT device; a communication module arranged in the housing of the IoT device; a second electrical connecting part arranged on the housing of the IoT device, the second electrical connecting part being electrically connected to the communication module and a first electrical connecting part of an access point (AP) device; and a second assembly part arranged on the housing of the IoT device, configured to connect a first assembly part of the AP device correspondingly;
wherein the AP device and the IoT device are capable of being connected for communication by way of an electrical connection between the first electrical connecting part and the second electrical connecting part; and
the IoT device is able to be assembled with the AP device by way of a connection between the first assembly part and the second assembly part.

* * * * *